United States Patent

[11] 3,611,275

[72] Inventors Ernest John Leddy
Upper Montclair;
Nathan George Lesh, Livingston, both of N.J.
[21] Appl. No. 3,139
[22] Filed Jan. 15, 1970
[45] Patented Oct. 5, 1971
[73] Assignee Bell Telephone Laboratories, Incorporated
Murray Hill, N.J.

[54] THIN FILM CLIP-LEAD DEVICE
2 Claims, 4 Drawing Figs.

[52] U.S. Cl. .......... 339/258 P, 338/332, 339/17 C, 339/277 R
[51] Int. Cl. .......... H01r 13/12
[50] Field of Search .......... 339/17, 256, 258, 259, 275 C, 276 C, 277; 317/261; 338/322, 329, 332

[56] References Cited

UNITED STATES PATENTS

| | | | |
|---|---|---|---|
| 2,706,804 | 4/1955 | Ziebell .......... | 339/256 C |
| 3,187,242 | 6/1965 | Schick .......... | 317/261 |
| 3,312,927 | 4/1967 | Garrett .......... | 339/258 |
| 3,368,181 | 2/1968 | Gimpel .......... | 339/61 |

FOREIGN PATENTS

| | | | |
|---|---|---|---|
| 229,811 | 3/1925 | Great Britain .......... | 339/277 |

*Primary Examiner*—Joseph H. McGlynn
*Attorneys*—R. J. Guenther and Edwin B. Cave

ABSTRACT: A clip-lead of unitary construction for use in making connections to thin film circuits and devices is described. The lead is of a flat design which makes it amenable to all types of external connecting means. The clip has a pincerlike head comprising a lower contacting member and multifurcated upper contacting members bonded to the mating bonding surface of the substrate.

PATENTED OCT 5 1971 3,611,275

INVENTORS E.J. LEDDY
N.G. LESH

BY Edward M. Fink
ATTORNEY

THIN FILM CLIP-LEAD DEVICE

BACKGROUND OF THE INVENTION

1. Field of the Invention

This invention relates to a thin film clip-lead device and more particularly to a one-piece clip-lead having a multifurcated resilient clip-head and a flat lead.

2. Description of the Prior Art

In order to simplify the assembly and connection of thin film printed circuit boards and thin film devices, it is necessary to have means for making plug-in connections which can be detached as often as desired. However, it is often necessary to have, in addition to plug-in connections, connections which generally must be detached only in case of trouble and thus be shockproof and extremely reliable in operation. The usual one-piece clip-lead has been fabricated for the plug-in connection and is designed to clamp upon or grasp a mating contact. Normally the latter above-mentioned connection, i.e., the permanent type, is obtained by using components called contact clips which have leads attached thereto in a nonunitary construction. These contact clips consist of sheet metal elements, obtained by stamping, which engage in a pencillike fashion the circuit board of thin film component, however, these clips have the disadvantage that the contact action allowed is not durable due to their short line of contact. If this short line of contact can be subdivided into a multiplicity of contact points which are self-locking, i.e., where each contact point can be bonded to the corresponding mating surface, the possibility of inoperativeness due to shock, for example, is diminished. However, where such lines of contact have been subdivided, the clip-head and lead have not been of a unitary construction but have been welded or soldered together, thus leading to decreased reliability. A unitary construction is desired for reasons of reliability, ease of fabrication and the avoidance of a multiplicity of clips and leads attached to a particular thin film circuit board or device. The unitary clip-lead having a multicontact head, in which all or a portion of the contacts can be bonded to one or several thin film circuits or devices, and having a lead which is amenable to direct solderless connection with external thin film circuits and/or devices has long been desired.

SUMMARY OF THE INVENTION

The present invention is directed to a thin film connector device satisfying the noted requirements. The device consists of a clip-lead of one-piece construction which can be obtained through simple stamping and forming operations. The clip-head consists of a plurality of furcations which are used to contact the thin film circuits or devices. The individual furcations or contacts are self-locking and may each be bonded to the thin film circuit or device. The lead is of a flat design which makes it amenable to all types of bonding to external circuits.

DETAILED DESCRIPTION

Figures 1, 2, 4:
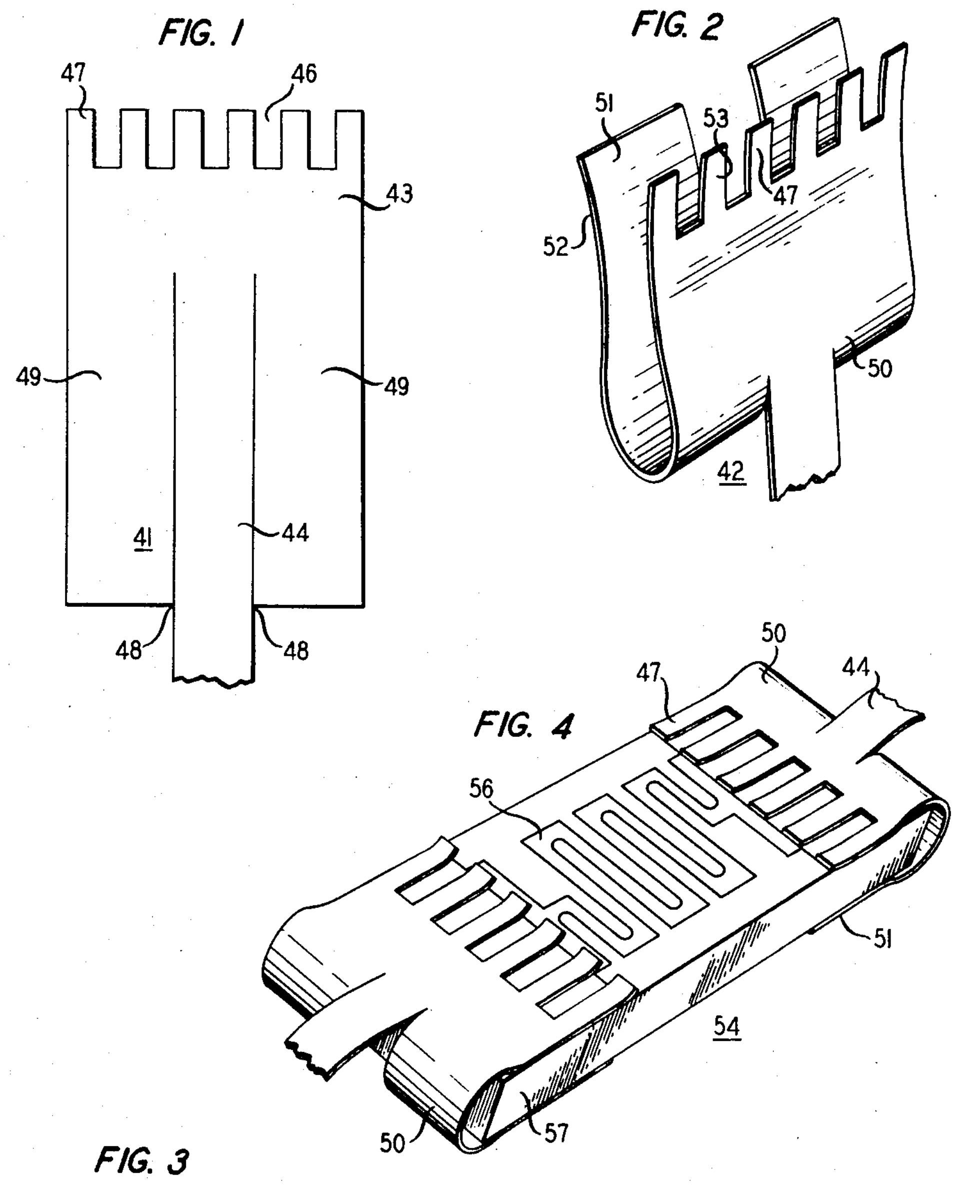
FIG. 1 is a plan view of a clip-lead blank prior to the forming operation.
FIG. 2 is a plan view of the clip-lead of FIG. 1 after the forming operation.
FIG. 4 is a perspective view of the inventive clip-lead attached to a typical thin film device.

The inventive clip-lead may be fabricated in the following manner. Initially a suitable metal blank, e.g., copper, if fed to a stamping machine in which a clip-lead blank 41, such as that shown in FIG. 1, is formed. A suitable metal blank is one which is resilient and conductive. The thickness of the metal blank is limited only by the size of the resultant clip-lead 42 (FIG. 2) desired, the loss in the resiliency of the metal and the difficulty of fabrication. The clip-lead blank 41 has a head section 43 and a lead or tail section 44, having a smaller width than the head section 43. Stamped or slotted at predetermined points across one side of the head section 43, opposite the tail section 44, are a series of slots 46 which define a plurality of furcations or contacts 47. The physical dimensions of the slots 46, i.e., the length and width, as well as their number, are, of course, dependent upon the size of the resultant clip-lead 42 (FIG. 2) and the number of furcations 47 desired.

As illustrated in the FIG. 1, the head section 43 and the lead or tail section 44 are rectangular in shape but this if for illustrative purposes only and the inventive embodiment is not to be restricted thereby for both the head and tail sections 43, 44 may be parallelepiped or of a curved configuration. In this regard, slots 46 have been depicted as being parallel to a vertical plane and to one another. However, the slots 46 should not be so restricted for they may deviate from a vertical plane and need not be parallel to one another. Also stamped out or slitted are 2 slits 48, 48 which are located on opposed sides of the tail section 44 and which extend from the side of the head section 43 adjoining the tail section 44. The slits 48, 48 are parallel to a vertical plane and define two tabs 49, 49 of the head section 43. The length of the slits 48, 48 is dependent upon the use of the resultant clip-lead 42. The length may be such as to give no extension beyond the upper and lower contact surfaces, in respect to one another, or they may be such as to give such an extension.

Figure 3:
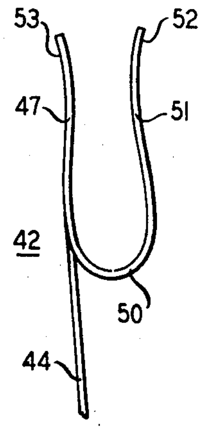
FIG. 3 is a side view of a typical one-piece clip-lead.

Referring to FIGS. 2 and 3, after the clip-lead blank 41, slots 46, and slits 48 have been stamped out, the resultant blank is exposed to a forming operation whereby tabs 49, 49 are bent below the horizontal axis of the lead section 44 to form a clip-head 50. The clip-head 50 has lower contacting surface members 51 which have a curved lip 52 formed on the end thereof, which lip 52 curves in a downward direction. The upper contacting surface of the clip-head 50 consists of the multifurcations 47 whose ends are bent to form curved lips 53 which extend upward. By so forming the clip-lead 42 it can readily be seen that the clip-head 50 is in a pincerlike form (FIG. 3). Also, it can be appreciated that the lead 44 is of a flat design which makes it amenable to all types of direct bonding such as thermal compression, thermal pulse, compliant and ultrasonic, without the use of wire leads and without the use of solder.

In a typical example, which is illustrative of the inventive embodiment and is not restrictive thereof, an oxygen-free copper blank, having a thickness of 0.008 inch, was fed to a stamping machine whereby a clip-lead bland 41, similar to that shown in FIG. 1 was formed. Such a blank had to be of sufficient size to accommodate a substrate having a thickness of 0.026 inch. Five slots 46 were slotted along the side of the head section 43. The slots are 0.073 inch long by 0.014 inch wide and thereby define six furcations 47, which are 0.073 inch long by 0.015 inch wide. Slits 48, 48 were made on either side of the lead section 44 and these are of such a length as to create no extension between the lower 51 and upper contacting members 47 when the clip-head 50 is formed.

Referring to FIGS. 2 and 3, the clip-lead blank 41 was then subjected to a forming operation whereby the tabs 49, 49 formed by the slitting operation were bent below the tail section 44 to form the clip-head 50 having an overall length of 0.113 inch. The flat lead formed is 1.6 inches in length. The initial distance between the contacting members 47 and 51 of the clip-lead 50 is 0.022 inch and increases along the horizontal axis of the clip-head 50 to a maximum of 0.036 inch. When the forming operation was completed, the copper clip-lead 42 was plated with gold, employing standard plating techniques to form a gold plate of 90 microinches.

Referring to FIG. 4, there is shown a typical thin film resistor 54 comprising a tantalum nitride resistor pattern 56, formed on a suitable substrate 57. The substrate which is 0.026 inch in thickness was inserted into the clip-head 50 whereupon the contacting surfaces 47 and 51 were resiliently displaced to grasp said substrate 57 in a pincerlike fashion.

The individual members 47, contacting said $Ta_2N$ resistor pattern, were then thermocompression bonded to said $Ta_2N$ pattern 56.

What is claimed is:

1. A device adapted to form a bonded electrical connection to a conductive pattern on a circuit board comprising a generally U-shaped flat metal spring clamp having a point of minimum spacing between the two legs of the U, said point being located at a position between the ends of each leg, said minimum spacing being less than the thickness of the circuit board to which the connector is to be bonded, so as to enable the connector to be clamped by its spring action to the board before and during the bonding of a first one of its legs to the conductive pattern on the circuit board, said legs being spaced apart from one another at their outer ends of distance greater than said minimum spacing so that when clamped upon a circuit board the said first leg tends to lie with a portion of its flat surface in contact with said conductive pattern, said first leg being slotted at and near its outer end so as to define a plurality of fingers each adapted to made contact with said conductive pattern, the second leg of the u being split into three longitudinal sections constituted by two outer sections and one middle section, the two outer sections remaining in the generally U-shaped configuration and being adapted, together wit said first leg, to exert a clamping action on the circuit board, the middle section being positioned outwardly from the U so as to serve as an integral electrical lead.

2. Device in accordance with claim 1 wherein said middle section is positioned so as to constitute essentially a continuation of said first leg.